United States Patent
Nguyen et al.

(10) Patent No.: US 10,447,047 B2
(45) Date of Patent: Oct. 15, 2019

(54) CHARGING ENERGY STORAGE MODULES

(71) Applicant: HEWLETT PACKARD ENTERPRISE DEVELOPMENT LP, Houston, TX (US)

(72) Inventors: Hai Nguyen, Houston, TX (US); Abhishek Banerjee, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 122 days.

(21) Appl. No.: 15/141,520

(22) Filed: Apr. 28, 2016

(65) Prior Publication Data

US 2017/0317509 A1 Nov. 2, 2017

(51) Int. Cl.
- *H02J 7/00* (2006.01)
- *H02J 9/06* (2006.01)

(52) U.S. Cl.
CPC ............ *H02J 7/0024* (2013.01); *H02J 9/061* (2013.01)

(58) Field of Classification Search
USPC .................................................. 320/124–125
See application file for complete search history.

(56) References Cited

U.S. PATENT DOCUMENTS

| | | | | |
|---|---|---|---|---|
| 5,003,244 A | 3/1991 | Davis | | |
| 5,698,967 A * | 12/1997 | Baer | ................. | B60L 11/1846 320/119 |
| 5,780,991 A * | 7/1998 | Brake | ................. | H01M 10/441 320/106 |
| 6,204,630 B1 * | 3/2001 | James | .................... | H02J 7/022 320/104 |
| 6,664,762 B2 | 12/2003 | Kutkut | | |
| 7,745,025 B2 | 6/2010 | Leach et al. | | |
| 8,450,980 B2 * | 5/2013 | Kumar | .................... | H02J 9/061 307/64 |
| 9,735,590 B2 * | 8/2017 | Wang | .................... | H02J 7/0016 |
| 2009/0243550 A1 * | 10/2009 | Arai | ......................... | H02J 7/04 320/157 |
| 2010/0079000 A1 * | 4/2010 | Yamamota | ........... | H02J 7/0027 307/39 |
| 2016/0248261 A1 * | 8/2016 | Tokuda | ..................... | H02J 3/14 |

FOREIGN PATENT DOCUMENTS

CN 204304550 U 4/2015

OTHER PUBLICATIONS

Wayne Kelsoe, Article, Installing an Automatic Charge Relay in a system with a Dual-or Triple-output Battery Charger, www.bluesea.com/resources/94/Multiple_Output_Battery_Chargers.

* cited by examiner

*Primary Examiner* — Samuel Berhanu
(74) *Attorney, Agent, or Firm* — Tarolli, Sundheim, Covell & Tummino L.L.P.

(57) ABSTRACT

An apparatus includes a plurality of energy storage modules (ESMs) to store charge. Each ESM includes module inputs to receive the charge. A plurality of charging circuits supply electrical energy to charge the ESMs via an output from each of the charging circuits. A switch network selectively switches each of the outputs from each of the charging circuits to the respective module inputs of each of the ESMs in response to a control command.

6 Claims, 7 Drawing Sheets

CHARGING ENERGY STORAGE MODULES

BACKGROUND

A battery charging system transfers energy into a battery module or a string of modules. The charging protocol utilized by the charging system generally depends on the size and type of the battery being charged. For instance, some battery types have high tolerance for overcharging and can be recharged via connection to a constant voltage source or a constant current source. Chargers of this type may require manual disconnection at the end of the charge cycle, or may have a timer to cut off charging current at a fixed time. Other battery types cannot withstand long, high-rate overcharging without causing damage to the battery. In such cases, the battery charging system may utilize voltage sensing circuits and a microprocessor controller to adjust the charging current, determine the state of charge, and provide cut-off at the end of charge, for example.

DETAILED DESCRIPTION

This disclosure relates to a switch network to store charge on energy storage modules (ESMs). A plurality of ESMs can be individually controlled and/or controlled as a group to store charge. Each ESM includes module inputs to receive the charge where a plurality of charging circuits can supply electrical energy to charge the ESMs via an output from each of the charging circuits. The switch network selectively switches each of the outputs from each of the charging circuits to the respective module inputs of each of the ESMs in response to a control command. The control command can be generated by a controller which can monitor charge on each of the ESMs with respect to predetermined voltage threshold to control ESM charging (e.g., if stored voltage less than threshold) or bypassing ESM modules that are suitably charged (e.g., if stored voltage exceeds predetermined threshold). The switch network operates in charge mode based on the control command to selectively connect the respective module inputs of one or more of the ESMs to the respective charging circuit outputs to receive the electrical energy. The switch network operates in bypass mode based on the control command to bypass the respective inputs of one or more of the ESMs from receiving the charge.

The switch network includes a separate input switch connected from at least one of the outputs of the respective charging circuits to at least one of the module inputs of each of the ESMs to transfer charge to the respective ESM in charge mode when the separate input switch is closed. A separate bypass switch can be connected across the respective outputs of the each of the charging circuits and across the respective module inputs of each of the ESMs to bypass charge from the respective ESM in bypass mode when the separate bypass switch is closed. When operating in the bypass mode, such as when a given ESM is determined by the controller to be adequately charged, the bypass switch routes charge away from the given ESM. To facilitate more efficient and faster charging of the ESMs the switch network can include a series switch connected between each of the outputs of the charging circuits and respective inputs of the ESMs to aggregate output voltages from the respective charging circuits to charge the ESMs when the series switch is closed. By aggregating outputs of multiple modules, larger overall charging voltages can be applied to a selected grouping of modules to facilitate faster charging of the group.

To facilitate connecting and disconnecting ESMs in the respective charge, bypass, and/or series connected modes, isolation can be provided on both the output side of the charging circuit and on the input side of the ESMs. For instance, each of the ESMs can include an input isolation stage coupled between the module inputs and the ESM to supply the electrical energy. Each of the charging circuits can include an output isolation stage that includes outputs to supply the electrical energy to a respective input isolation stage of a respective ESM.

Figure 1:
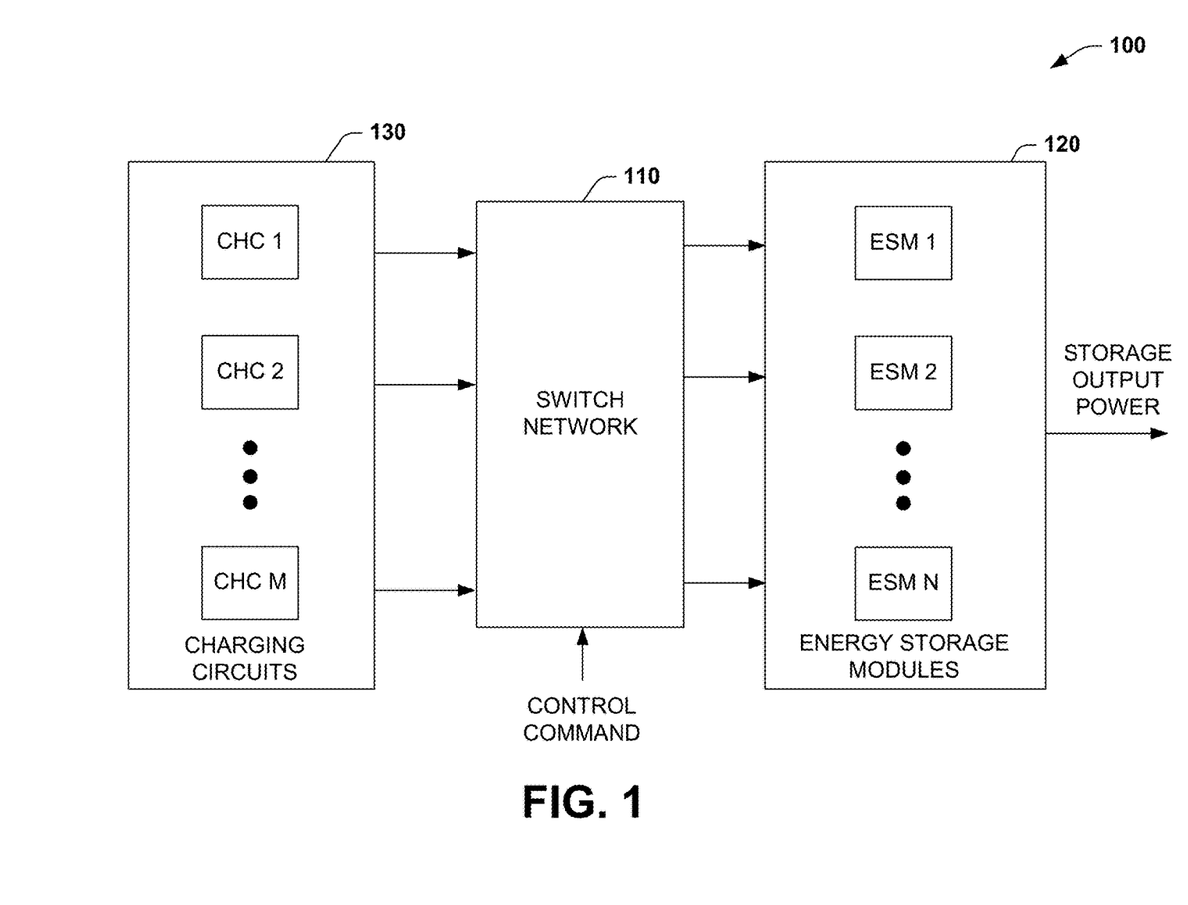
FIG. 1 illustrates an example of an apparatus that includes a switch network to transfer charge to energy storage modules.

FIG. 1 illustrates an example of an apparatus 100 that includes a switch network 110 connected between a plurality of charging circuits 130 and a plurality of energy storage modules (ESMs) 120, shown as ESM 1 through ESM N, with N being a positive integer. For example, the switch network can include switch devices (e.g., semiconductor switch devices) of the switch network 110 that can be selectively activated and deactivated to connect each of the charging circuits 130 with a respective ESM to transfer charge to the ESMs. In one example, the ESMs 120 can be grouped together (e.g., groups of four, six, eight etc.) where the group can be housed in another module (see e.g., FIGS. 4 and 5) to collectively stored energy for providing backup power to a system (e.g., uninterruptable power supply configuration to supply backup power to a computer or network rack). Each ESM 1 through N in the modules 120 includes module inputs to receive the charge where the respective module inputs can be isolated (e.g., transformer isolation) from circuits transferring the charge to the ESMs.

A plurality of charging circuits 130, shown as CHC1 through CHC M, with M being a positive integer, supply electrical energy to charge the ESMs 120 via an output from each of the charging circuits. In some examples, there can be a dedicated charging circuit CHC for each respective ESM (e.g., N=M). As will be described further below with respect to FIG. 2, the outputs from each of the charging circuits 130 can also be isolated (e.g., transformer isolation) to provide output side isolation in the apparatus 100. Thus, the apparatus 100 can include input side isolation in the ESMs 120 and output side isolation in the charging circuits 130. Such input and/or output isolation allows modules to be charged in various modes as described herein including individual module charging mode where a given ESM is charged in isolation from other modules. Another mode includes bypass mode where one or more modules in a series string of modules to be charged is bypassed from receiving charge from the charging circuits 130. The isolation described herein facilitates bypass mode by allowing a given ESM to be connected or disconnected from any portion of a series of ESMs that are being collectively charged without affecting other charging ESM members of the series.

The switch network 110 can selectively switch each of the outputs from each of the charging circuits 130 to the respective module inputs of each of the ESMs 120 in response to a control command (e.g., generated by a controller). The switch network 110 operates in charge mode based on the control command to selectively connect the respective module inputs of one or more of the ESMs 120 to the respective charging circuit outputs 130 to receive the electrical energy. The switch network 110 operates in bypass mode based on the control command to bypass the respective inputs of one or more of the ESMs 120 from receiving the charge.

The switch network 110 can include a separate input switch connected from at least one of the outputs of the respective charging circuits 130 to at least one of the module inputs of each of the ESMs 120 to transfer charge to the respective ESM in charge mode when the separate input switch is closed. A separate bypass switch can be connected across the respective outputs of the each of the charging circuits 130 and across the respective module inputs of each of the ESMs 120 to bypass charge from the respective ESM in bypass mode when the separate bypass switch is closed. Bypass mode routes current away from a given ESM when it is determined by the controller to be adequately charged, for example.

To facilitate more efficient and faster charging of the ESMs, the switch network 110 can include a series switch connected between the outputs of the charging circuits to aggregate output voltages from the respective charging circuits to charge the ESMs when the series switch is closed. By aggregating outputs of multiple modules, larger overall charging voltages can be applied to a selected grouping of modules to facilitate faster charging of the group. The following examples described below with respect to FIGS. 2 through 7 illustrate various isolation, charging, and switching circuits.

Figure 2:
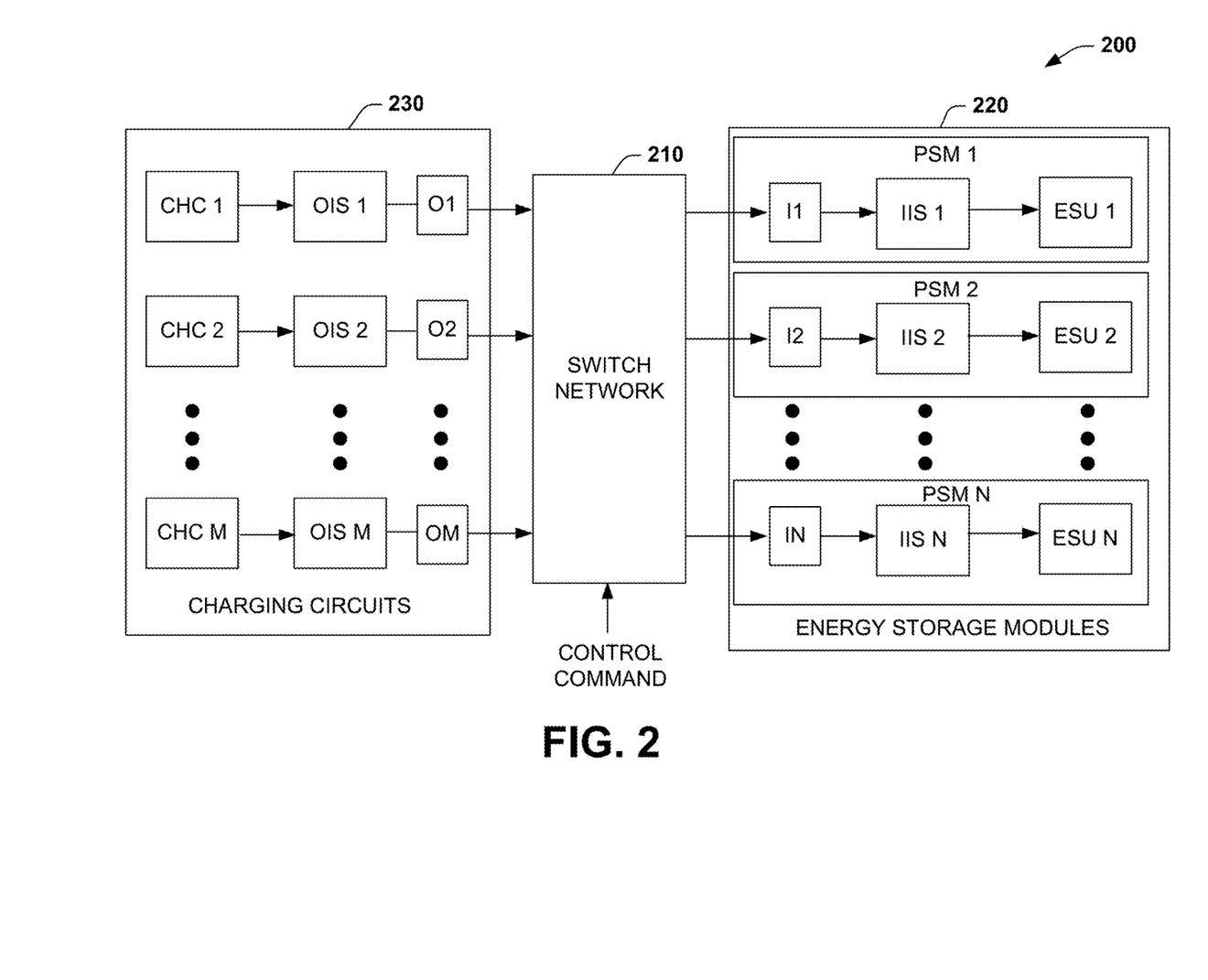
FIG. 2 illustrates an example of an apparatus that employs multiple isolation stages and includes a switch network to transfer charge to energy storage modules.

FIG. 2 illustrates an example of an apparatus 200 that employs multiple isolation stages and includes a switch network 210 to transfer charge to energy storage modules 220. Each ESM, shown as ESM 1 through N in the modules 220 include inputs to receive the electrical energy, with ESM 1 connected to inputs I1, ESM 2 connected to inputs I2, and ESM N connected to inputs IN. Energy storage units, shown as ESU 1 through ESU N, are connected to the respective inputs I1 through IN and include at least one storage cell (e.g., rechargeable battery including one or more electrochemical cells) to store the charge in response to the electrical energy supplied by charging circuit 230. Each energy storage module includes an input isolation stage (IIS). Thus in the example of FIG. 2, the IIS for each energy storage module includes an IIS, demonstrated as IIS 1 through IIS N, which is coupled between the respective module inputs I1 through IN and the respective energy storage unit ESU 1 through ESU N to supply the electrical energy for charging the respective energy storage unit. A plurality of charging circuits 230 supply the electrical energy to the ESMs 220 via the switch network 210.

Each of the charging circuits, shown as CHC 1 through CHC M, includes an output isolation stage shown as OIS 1 through OIS M that includes outputs O1 through OM to supply the electrical energy to a respective input isolation stage of a respective ESM. Each OIS electrically isolates the charging circuits from the switch network, such as by including respective transformers to inductively couple each CHC with respective ESMs via the switch network. The switch network 210 include switch devices (e.g., semiconductor switches) connected between the outputs of each of the charging circuits O1 through OM and the module inputs I1 through IN of each ESM. The switch network 210 selectively switches each of the respective outputs O1 through OM from each of the output isolation circuits OIS 1 through OIS M of each of the charging circuits CHSC 1 through CHC M to the respective module inputs I1 through IN of each of the ESMs in response to a control command. As disclosed herein, the control command can depend on an operating mode of the charging system with respect to each of the ESMs. Another example of the switch network 210 is disclosed with respect to FIG. 6.

Figure 3:
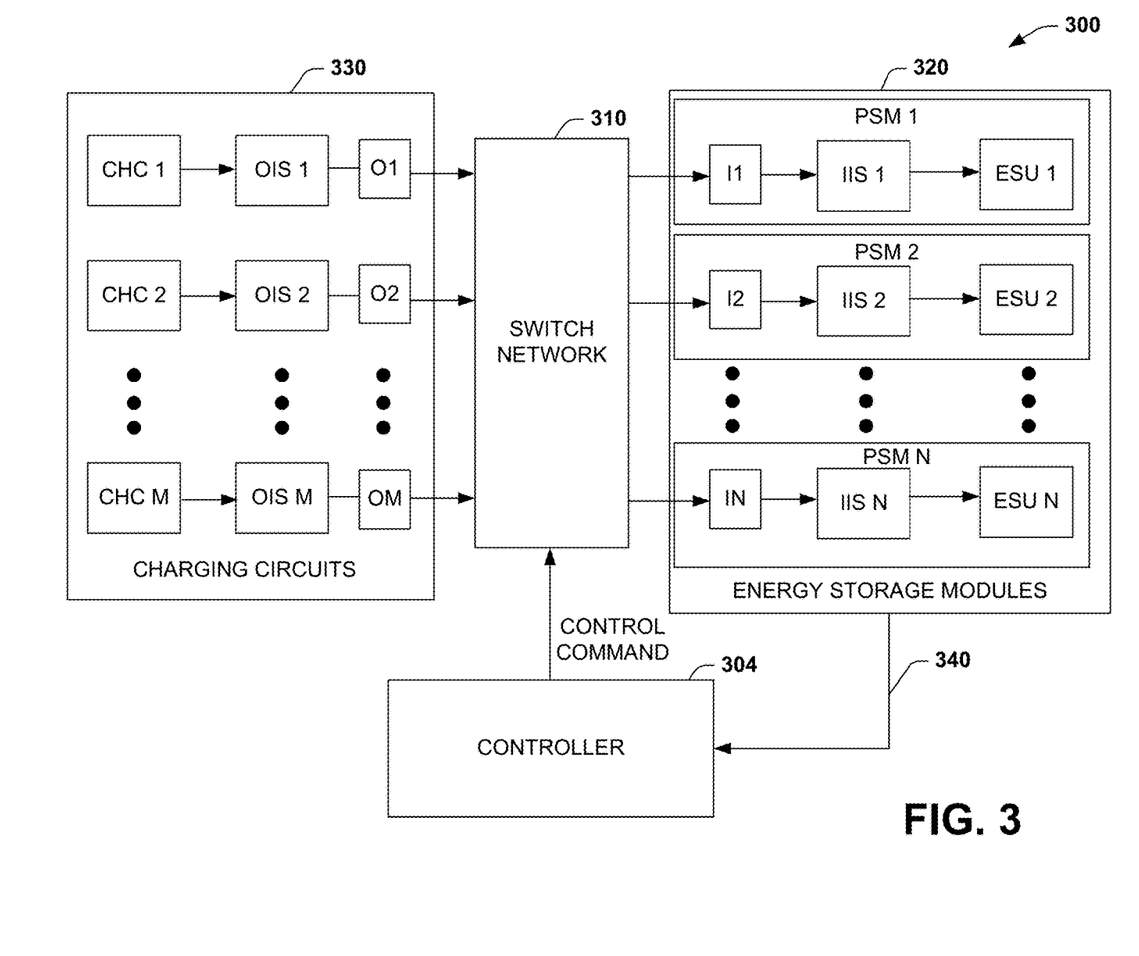
FIG. 3 illustrates an example of an apparatus that employs multiple isolation stages and includes a controller to control a switch network to transfer charge to energy storage modules.

FIG. 3 illustrates an example of an apparatus 300 that employs multiple isolation stages and includes a controller 304 to control a switch network 310 to transfer charge to energy storage modules 320. Similar to the example of FIG. 3, each ESM, shown as ESM 1 through N in the modules 320 include inputs to receive the electrical energy, with ESM 1 connected to inputs I1, ESM 2 connected to inputs I2, and ESM N connected to inputs IN. Energy storage units, shown as ESU 1 through ESU N, are connected to the respective inputs I1 through IN and include at least one storage cell to store the charge in response to the electrical energy. An input isolation stage, shown as IIS 1 through IIS N is coupled between the respective module inputs I1 through IN and the respective energy storage unit ESU 1 through ESU N to supply the electrical energy for charging the respective energy storage unit. A plurality of charging circuits 330 supply the electrical energy to the ESMs 320 via the switch network 310. Each of the charging circuits, shown as CHC 1 through CHC M, includes an output isolation stage shown as OIS 1 through OIS M that includes outputs O1 through OM to supply the electrical energy to a respective input isolation stage of a respective ESM.

The switch network 310 connected between the outputs O1 through OM of the charging circuits CHC 1 through CHC M and the module inputs I1 through IN of each ESM 1 through N. The switch network operates 310 in charge mode based on the control command from the controller 304 to selectively connect the respective module inputs I1 through IN of one or more of the ESMs to the respective charging circuit outputs O1 through OM to receive the electrical energy. The switch network operates in bypass mode based on the control command to bypass the respective inputs of one or more of the ESMs from receiving the charge.

The controller 304 generates the control command to the switch network 310 based on a feedback 340. The feedback 340 can be provided from one or more sensor circuits (e.g., voltage sensors, charge sensors or the like) coupled to the ESMs of the energy storage system. For example, the feedback 340 provides an indication (e.g., analog or digital value) of storage level voltages of each of the ESMs relating to the amount of stored charge. The controller 304 thus monitors a charging state with respect to a predetermined voltage level for each of the respective ESMs 1 through N (e.g., based on feedback 340) to selectively charge the respective ESMs via the switch network 310 based on the charging state. If one or more modules are sufficiently charged based on the determined charging state (e.g., measured charge is equal to or greater than a predetermined charge threshold), the respective ESM can be bypassed from receiving more charging via operation of the switch network 310 in a bypass mode.

The controller 304 can include a processor to execute instructions stored in the memory. The processor can be a central processing unit (CPU), field programmable gate array (FPGA), or a set of logic blocks that can be defined via a hardware description language such as VHDL. The instructions can be executed out of firmware, random access memory, and/or executed as configured logic blocks such as via registers and state machines configured in a programmable gate array, for example.

The controller 304 can control a transfer switch (see e.g., FIG. 9) on the respective ESM to transfer energy from a given module to a backup system (e.g., a UPS system—not shown) if the ESM is not being charged. The controller 304 can also control such transfer switch on the respective ESM to disconnect the transfer of energy to the backup system when the ESM is being charged.

Figure 4:
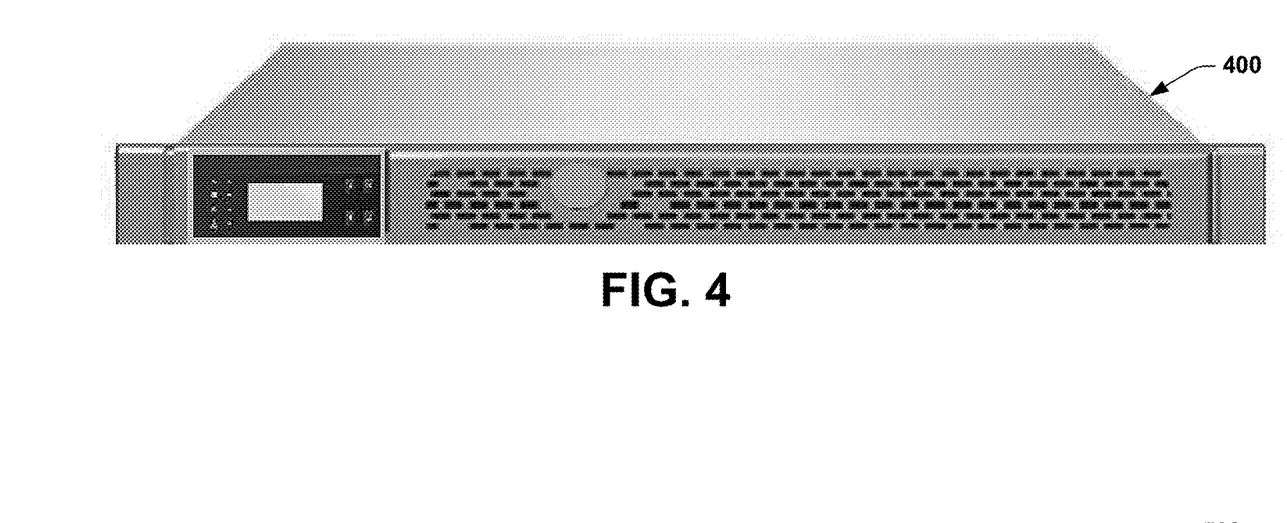
FIG. 4 illustrates an example of an external view of a charging module that houses a plurality of energy storage modules to supply backup power to a system.

FIG. 4 illustrates an example of an external view of a charging module 400 that houses a plurality of energy storage modules (ESMs) to supply backup power to a system. The charging module 400 and associated ESMs can be provided as a backup module that plugs into (or otherwise electrically connects to) a rack having a backplane, for example, used in server or networking applications. The charging module 400 can selectively charge undercharged ESMs—individually and/or on groups. When the respective ESMs are charged, the charged ESMs can supply backup power to the rack. The controller described herein can control charging and switching to backup mode in the event of rack power loss where the module 400 can supply stored energy from the ESMs to the rack.

Figure 5:
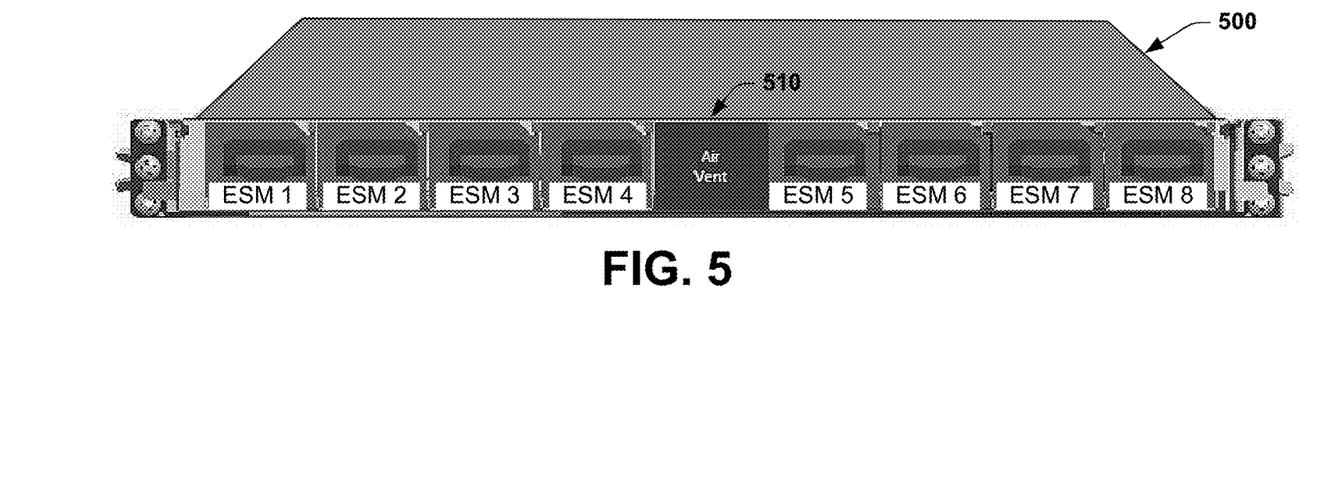
FIG. 5 illustrates an example of an internal view of a charging module that houses a plurality of energy storage modules to supply backup power to a system.

FIG. 5 illustrates an example of an internal view of a charging module 500 that houses a plurality of energy storage modules to supply backup power to a system. The module 500 represents the same module illustrated in FIG. 4 without a covering over respective ESMs in the rack. In this example, eight ESMs shown as ESM 1 through ESM 8 can be provided. The ESMs 1 through 4 can be switched and controlled via switch network and controller as one grouping to supply backup power to the rack and ESMs 5 through 8 can be switched and controlled as another grouping to supply backup power to another portion of the rack. Other groupings are possible. An air vent 510 can be provided in the module 500 to provide cooling between ESM module groupings and associated circuitry (e.g., charging circuits, switch circuits and other power electronics).

Figure 6:
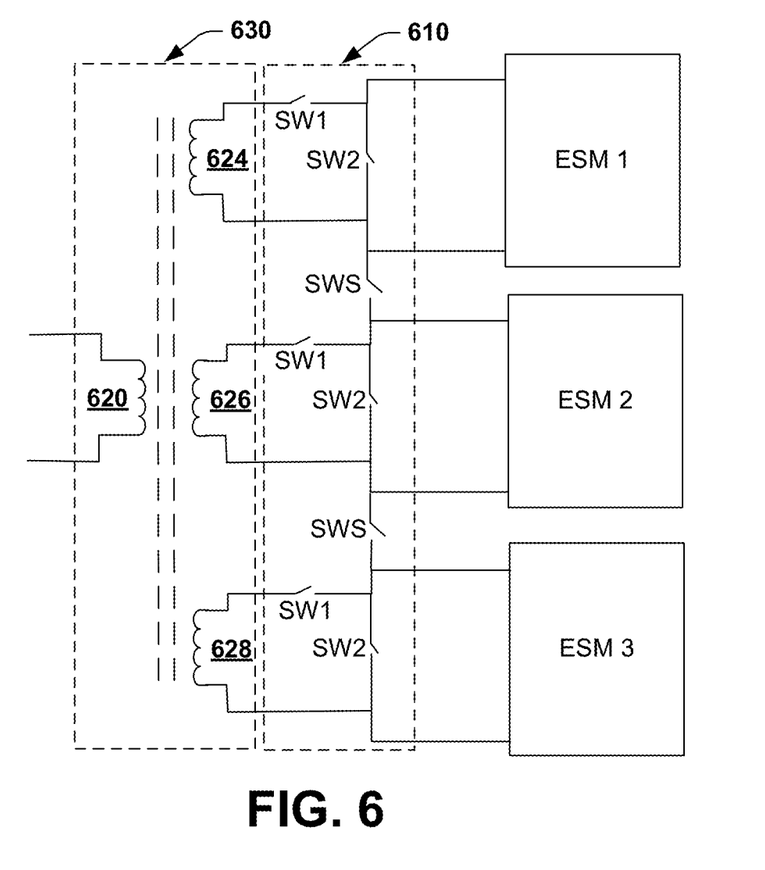
FIG. 6 illustrates an example of a switch network and multiple isolation windings to control energy storage module charging and discharging.

FIG. 6 illustrates an example of a switch network 610 to control energy storage module charging and discharging. In this example, isolated charge is delivered from a transformer output 620 of a charging circuit 630. Three transformer outputs 624 through 626 supply charge to three energy storage modules (ESMs) 1 through 3 via the switch network 610. As shown each of the ESMs 1 through 3 can be associated with a switch shown as SW1 to connect or disconnect charging to the respective ESM. Each of the ESMs 1 through 3 can be associated with a bypass switch shown as SW2 to control bypassing a module within a string of ESMs from being charged. A series switch shown as SWS between ESMS can be employed to aggregate charging voltages across multiple ESMs when they are switched in series by the switch network 610.

An example truth table is outlined below to show how various combinations of the respective switches for operating each respective module in one of a plurality of modes respective modes

| Sw1 | Sw2 | SwS | MODE |
|-----|-----|-----|------|
| ON  | OFF | OFF | Individual module charging |
| ON  | OFF | ON  | More than one module charging in a group of selected modules to be charged |
| OFF | ON  | ON  | Bypass a particular module |

For individual module charging (e.g., when no other modules need to be charged, SW1 is on and SW2 and SWS is off. To enable the most efficient charging, SWS and SW1 are on to allow modules to be charged in series and thus aggregate higher voltages across the group of modules which allows for more efficient and rapid charging. For bypass mode, SW1 is off and both SW2 and SW3 is on.

Figure 7:
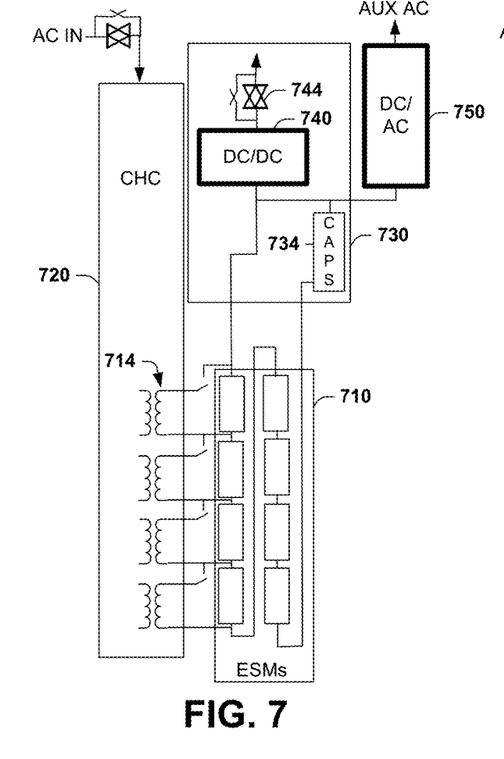
FIG. 7 illustrates an example of energy storage modules connected in series to supply power to a backup system.
Figure 9:
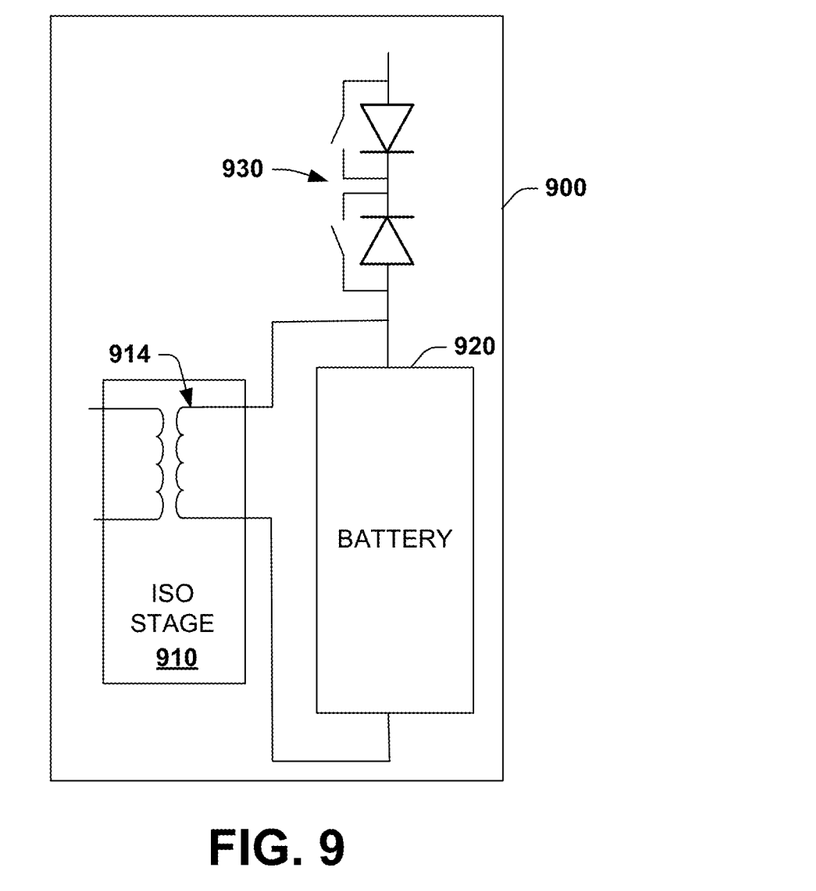
FIG. 9 illustrates an example of an energy storage module that includes an input isolation stage.

FIG. 7 illustrates an example of energy storage modules (ESMs) 710 connected in series to supply power to a backup system. The ESMs 710 are charged via isolated outputs 714 from a charging circuit 720. Each of the ESMs 710 can also include input isolation such as depicted in the example of FIG. 9. In this example, the ESMs 710 are grouped in sets of four where each set is connected in series to provide a DC output voltage (e.g., 300 to 500 VDC). Output from the ESMs is provided to a power module 730, which can include capacitors 734 to filter the output from the ESMs 710. The power module 730 can include a DC/DC converter 740 to supply DC power via switch 744 to a backplane (not shown) based on electrical power supplied by the arrangement of ESMs 710. As another example, an auxiliary DC/AC supply 750 can be switched in lieu of (or in addition to) the DC output voltage from the DC/DC converter 740 to provide backup AC power to the backplane, if desired.

Figure 8:
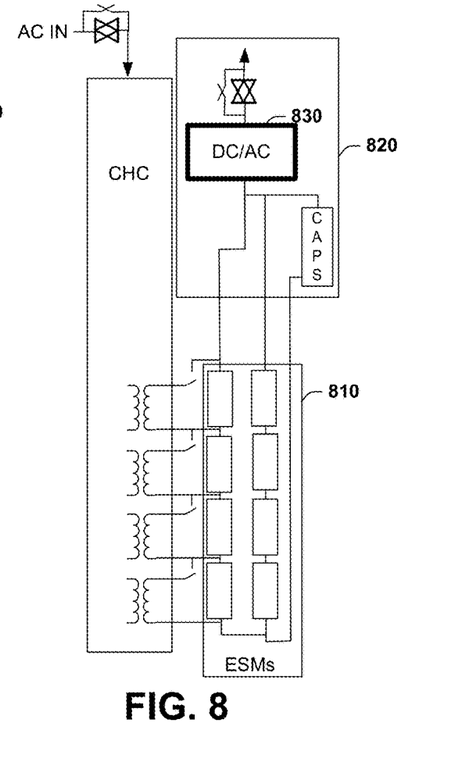
FIG. 8 illustrates an example of energy storage modules connected in parallel to supply power to a backup system.

FIG. 8 illustrates an example of energy storage modules 810 connected in parallel to supply power to a backup system. In this example, two groupings of four ESMs can be connected in parallel to supply energy to a power module 820. When connected in parallel, the ESMs provide a lower output DC voltage (e.g., 150 to 250 volts) which in this example is converted to an AC voltage via DC/AC converter 830 to supply AC power to the backplane.

FIG. 9 illustrates an example of an energy storage module 900 that includes an input isolation stage 910. The input isolation stage 910 includes a transformer 914 to transfer charge to a battery 920 acting as an energy storage unit as described herein. The battery 920 can include a plurality of cells (e.g., 14 storage cells) to store charge for the ESM 900. The ESM can include includes a transfer switch 930 to transfer energy to a backup system when the battery 920 is not being charged and to disconnect the transfer of energy to the backup system when the battery is being charged.

What has been described above includes examples. It is, of course, not possible to describe every conceivable combination of components or methods, but one of ordinary skill in the art will recognize that many further combinations and permutations are possible. Accordingly, this disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An apparatus, comprising:
a plurality of energy storage modules (ESMs), each having a first input and a second input;
a plurality of charging circuits to supply electrical energy to charge the ESMs, each having a first output selectively connectable to the first input of a corresponding one of the ESMs and a second output connected to a second input of the corresponding ESM; and
a switch network comprising:
connection switches, each to selectively connect the first output of one of the charging circuits to the first input of a corresponding one of the ESMs in response to a control command,
bypass switches, each to selectively connect the first input of a corresponding one of the ESMs to the second input of the corresponding ESM; and
series switches, each to selectively connect the second input of one of the ESMs to the first input of another one of the ESMs,
wherein the switch network is to:
charge the ESMs individually by closing the connection switches and opening the bypass switches and the series switches;
charge the ESMs in series with aggregated voltages by closing the connection switches and the series switches and opening the bypass switches; and
bypass one of the ESMs by opening the corresponding connection switch while closing the corresponding bypass switch.

2. The apparatus of claim 1, further comprising a controller to generate control commands that control the switch network to change between modes of charging the ESMs based on respective charging states of the ESMs.

3. The apparatus of claim 1, wherein each of the ESMs includes an energy storage unit to store charge in response to the electrical energy,
Wherein each respective ESM of the ESMs includes transformer coupled between the first and second inputs of the respective ESM and the energy storage unit of the respective ESM to supply the electrical energy for charging the energy storage unit of the respective ESM.

4. The apparatus of claim 1, comprising a charger that includes a transformer comprising an input circuit and the charging circuits, wherein each of the charging circuits an output circuit of the transformer and is isolated from the input circuit.

5. The apparatus of claim 3, wherein the energy storage unit includes a transfer switch to transfer energy to a backup system when the energy storage unit is not being charged, and to disconnect the transfer of energy to the backup system when the energy storage unit is being charged.

6. The apparatus of claim 1, comprising a power module connected to the plurality of ESMs, wherein the power module includes a DC/DC converter to supply DC power to a backplane based on electrical power supplied by the plurality of ESMs.

* * * * *